Fig.2.

Inventors:
Benjamin Cooper,
Charl D. Cillié,
by Harry E. Dunham
Their Attorney.

Patented May 4, 1948

2,440,932

UNITED STATES PATENT OFFICE 2,440,932

INTERMITTENT POWER CONTROL WITH END PERIOD METER

Benjamin Cooper, Scotia, and Charl D. Cillié, Schenectady, N. Y., assignors to General Electric Company, a corporation of New York Application May 4, 1944, Serial No. 534,082

13 Claims. (Cl. 171—95)

Our invention relates to electric control circuits and more particularly to improved control circuits adapted for measuring or indicating the magnitude of an electrical condition of an intermittently energized circuit for each interval of energization. This application is a continuation-in-part of our application S. N. 510,958, filed November 19, 1943, entitled "Electric control circuits," and now abandoned.

In resistance welding applications, for example, it is desirable, in order to insure a uniform strength of weld, that the current or energy supplied to the material during each period of energization be the same. Regulating circuits for obtaining this result have been provided. In some cases, however, circumstances may arise which prevent the regulating equipment from maintaining the current at the desired level, and for this reason it becomes desirable to indicate to the operator that the proper value of current has not been supplied to a weld and in some cases to shut down the welding machines. As described in detail in Spittler and Johnson application S. N. 534,010 filed concurrently herewith and assigned to the assignee of the present invention, the voltage across the weld changes during the progress of the weld and the magnitude of this voltage at a particular instant, such as the end of the weld period, provides a good indication of the weld quality. Methods of controlling resistance welding operations in accordance with the voltage at the end of the weld period have been claimed in this Spittler and Johnson application. In accordance with the teachings of our invention, we provide new and improved circuits for providing indications of the above types in which the indication is maintained during the succeeding period of deenergization so that it is readily observed by the operator.

It is an object of our invention to provide a new and improved electric control or indicating circuit.

It is another object of our invention to provide a new and improved circuit for indicating the magnitude of an electrical condition of an intermittently energized circuit.

It is still another object of our invention to provide a new and improved circuit for indicating the magnitude of an electrical quantity supplied to an intermittently energized load circuit in which the indication is maintained constant during each period of energization, and is adjusted during each period of deenergization.

In accordance with one illustrated embodiment of our invention, an indicating instrument is controlled by the conductivity of an electric valve, the control member of which is maintained at the voltage of a capacitor. This capacitor is charged from a direct current supply circuit during each period of deenergization of the load circuit to a voltage depending on the voltage of a second capacitor which in turn is dependent upon the integral with respect to time of the current supplied to the load circuit during the last preceding period of energization. An electronic switching circuit is provided for adjusting the charge on the first capacitor during each period of deenergization. In accordance with a second embodiment of our invention, the indication is of weld current rather than the integral with respect to time of weld current. This indication is maintained during each period of deenergization and is adjusted during periods of energization of the load so that an indication of the current magnitude supplied to the load at the end of each period of energization is maintained during the next period of deenergization. In accordance with a third embodiment of our invention, an indication of the magnitude of the voltage across the weld at the end of the weld period is maintained during the next period of deenergization of the load circuit.

A better understanding of our invention may be had by reference to the following description taken in connection with the accompanying drawings and its scope will be pointed out in the appended claims. In the drawings.

Figure 1:
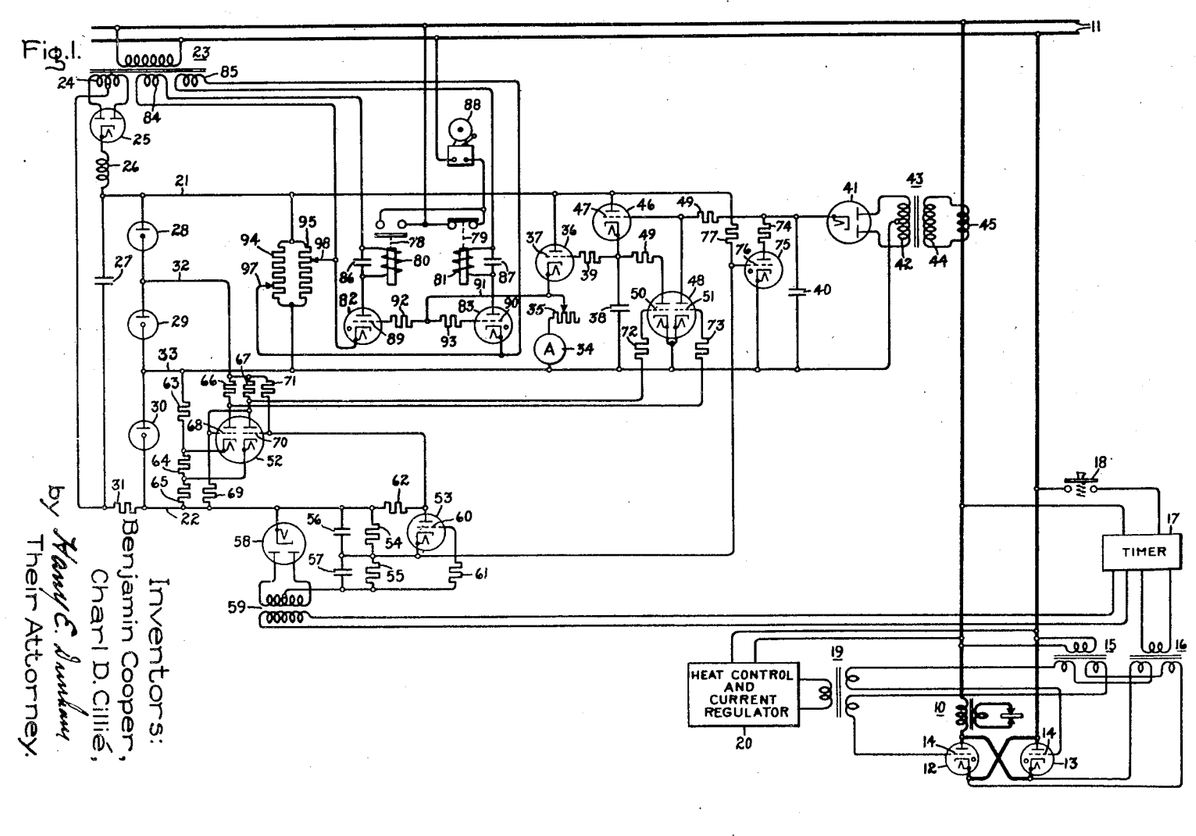
Fig. 1 is a schematic representation of one embodiment of our invention.

Referring now to Fig. 1 of the drawings, we have shown our invention as applied to a circuit for producing an indication of the time integral of current supplied to an intermittently energized circuit such as a resistance welding load circuit during each period of energization. A resistance welding transformer 10 is connected for energization from an alternating current supply circuit 11 by means of a pair of electric valves 12 and 13 which are reversely connected in parallel to supply alternating current to the load circuit. The electric valves 12 and 13 may be of the type employing an immersion-igniter control member, or, as illustrated, may include a heated cathode and utilize an ionizable medium such as a gas or a vapor. Each of the electric valves is provided with a control member 14 which is energized to determine the cycles and the instant in each cycle that the associated valve is rendered conductive. The control circuit for controlling the energization of these control members may be of any of the types well known in the art, and in the drawings has been illustrated as including a transformer 15 for supplying an alternating component of voltage to the control members 14 which is in phase opposition with the anode-cathode voltages thereof and a transformer 16 for supplying a component of alternating voltage to the control members 14 which is in phase with the anode-cathode voltages of electric valves 12 and 13 and which is applied intermittently under the control of the timer control designated generally by the numeral 17. The timer control is energized from the alternating current supply circuit 11 under the control of a manually operated initiating switch 18. A third component of voltage is impressed on the control members 14 by a transformer 19. These latter voltage components are preferably of peaked wave form and adjustable in phase with respect to the anode-cathode voltages of electric valves 12 and 13, in accordance with the magnitude of the current which it is desired to supply to the load circuit. The relative magnitudes of these voltage components are such that both the in-phase component supplied by transformer 16 and the peaked voltage supplied by transformer 19 are required to render valves 12 and 13 conductive. In this way the timer determines the cycles during which the valves conduct and the phase of the peaked voltages determines the time in the cycle that conduction is initiated. In the drawings, the primary of the transformer 19 has been shown as energized in accordance with the operation of the heat control and current regulator which has been indicated schematically at 20. This heat control and current regulator may be any of the types known in the art, and may to advantage be of the type described and claimed in the copending Cooper application, Serial No. 480,150, filed March 23, 1943, assigned to the assginee of the present invention, and now Patent No. 2,421,994, granted June 10, 1947.

As will be well understood by those skilled in the art, the resistance welding system thus far described is placed in operation by closing the manual switch 18. The welding transformer 10 is energized for an interval or a succession of intervals under the control of the timer control 17 and with a current having a magnitude dependent upon the operation of the heat control and current regulator designated by the numeral 20.

In accordance with one important aspect of the present invention, we provide an improved circuit for obtaining an indication of the total current supplied to the welding transformer during each period of energization thereof. Referring now to Fig. 1 of the drawing, the indicating circuit includes a source of direct current control voltage impressed on conductors 21 and 22. This voltage may be derived from any suitable source and, as illustrated, is obtained from the alternating current supply circuit 11 by means of a transformer 23 having a midtapped secondary winding 24 connected with an electric discharge device 25 to provide a full wave rectifier. The output of the rectifier is filtered by a series reactor 26 and a parallel capacitor 27 to supply a substantially smooth direct current voltage. The voltage appearing across conductors 21 and 22 is regulated by the gaseous discharge devices 28, 29 and 30 which are connected in series and across capacitor 27 through a regulating resistor 31. These gaseous discharge devices are of a type well known in the art and have a predetermined minimum voltage of ionization which they operate to maintain by drawing variable amounts of current through the resistor 31. These devices 28—30 also provide a voltage divider for establishing intermediate values of direct current voltage on conductors 32 and 33. The voltage appearing across conductors 21 and 33 is impressed on a series circuit including an indicating device such as an ammeter 34, a resistor 35 and the anode-cathode circuit of an electric valve 36. As illustrated the resistor 35 may be adjustable to provide a range adjustment for the meter 34. This electric valve is preferably of the high vacuum type and includes a control mmeber 37 which is controlled in accordance with the voltage of a capacitor 38. The control member 37 is connected with the positive terminal of capacitor 38 through a current limiting resistor 39. The other terminal of capacitor 38 is connected with conductor 33.

In accordance with our invention, we provide a novel circuit for maintaining the voltage of the capacitor 38 at a value dependent upon the integral with respect to time of the weld current for the last preceding period of energization. Referring to the drawings, a capacitor 40 is connected in the direct current circuit of a full wave rectifier including an electric discharge device 41 and the midtapped secondary winding 42 of a transformer 43. The primary winding 44 of the transformer 43 is energized from a current transformer 45 associated with one of the conductors supplying the welding transformer 10. During each period of energization of the load circuit, capacitor 40 operates to integrate with respect to time a quantity proportional to the weld current. During each period of energization no discharge circuit for capacitor 40 is effective, and the operation of the indicating circuit including valve 36 and ammeter 34 is controlled entirely by the voltage of capacitor 38. At the end of each period of energization, we provide means for adjusting the voltage of capacitor 38 in accordance with the value of voltage attained by capacitor 40 during the immediately preceding period of energization, and then holding this charge on capacitor 38 for the remainder of the period of deenergization and the next period of energization. The capacitor 40 is discharged as soon as the voltage of capacitor 38 is adjusted and made ready for integrating the weld current during the next period of energization. Capacitor 38 is charged from conductors 21 and 33 in accordance with the voltage supplied by the capacitor 40 by means of an electric valve 46 having the anode-cathode circuit connected between the upper terminal of capacitor 38 and conductor 21. This valve completes the charging circuit for the capacitor 38 between conductors 21 and 33, and is provided with a control member 47 which is maintained at a negative potential by the right-hand half of a double triode electric valve 48, preferably of the high vacuum type, which connects the control member 47 with the conductor 33, thereby maintaining the voltage of the control member substantially negative with respect to the cathode of the valve 46. The control member 47 is connected with the positive terminal of capacitor 40 through a current limiting resistor 49. Referring to the valve 48, the left-hand discharge path is connected between the conductor 33 and the positive terminal of capacitor 38 through a resistor 49. The control members 50 and 51 of the valve 48 are controlled so that the right-hand half of the valve is normally conducting and is rendered nonconducting only at the time at which it is desired to adjust the voltage of capacitor 38 corresponding to a new value of voltage on capacitor 40, and the left-hand half of valve 48, controlled by grid 50, is normally nonconducting and is rendered conducting only during those periods that the right-hand half is rendered nonconducting.

In accordance with the present invention, this reversal in the state of conductivity in the two halves of the valve 48 is accomplished by a switching valve 52 and an additional valve 53 which is controlled in accordance with the periods of energization and deenergization by means of a voltage derived from the timer circuit 17. Unidirectional voltages are impressed across resistors 54 and 55 which are shunted, respectively, with capacitors 56 and 57 by means of an electric valve rectifier including a discharge device 58 and a transformer 59 having the primary winding thereof energized from the timer control 17. Thus the unidirectional voltage impressed across resistors 54 and 55 in series by the rectifier circuit disappears during those periods corresponding to the periods of deenergization of the load circuit. However, the voltage across resistors 54 and 55 is maintained for a short interval after each period of energization by means of capacitors 56 and 57. The time constants of these parallel circuits are so chosen that the voltage of capacitor 57 collapses before the voltage of capacitor 56. As illustrated in the drawing, the control member 60 of electric valve 53 is connected to the negative terminal of capacitor 57 through a current limiting resistor 61 and is thereby maintained negative as long as the capacitor 57 remains charged. As soon as the voltage on capacitor 57 collapses, electric valve 53 becomes conductive and the anode-cathode circuit thereof is supplied with voltage by capacitor 56 to produce a voltage impulse across a resistor 62 which is connected between the positive terminal of capacitor 56 and the anode of electric valve 53. This impulse of voltage is utilized to control the switching valve 52 which, in turn, controls the valve 48. The valve 52 is a double-triode valve, preferably of the high vacuum type, and has the anode-cathode circuits thereof energized from the direct current supply circuit. Referring to the drawing, points of different voltage for the cathodes are provided by a voltage divider including resistors 63, 64 and 65 connected in series across conductors 22 and 33. The anodes are connected with the conductor 32 through resistors 66 and 67, respectively. The left-hand cathode is connected with the point on the voltage divider between resistors 63 and 64, and the right-hand cathode is connected at a point between resistors 64 and 65. A control member 68 for the left-hand discharge path is connected with the anode for the right-hand discharge path and to the conductor 22 through a resistor 69. With this connection, the control member 68 is at a substantial negative voltage with respect to the cathode thereof when the right-hand discharge of valve 52 is conducting, and at a voltage substantially more positive when the right-hand half of valve 52 is nonconducting. Thus the state of conductivity of the left-hand half of valve 52 is always the reverse of the state of conductivity of the right-hand half of this valve. The control member 70 of the right-hand half of valve 52 is normally maintained positive to render this half of the valve conducting by means of a voltage divider including resistors 71 and 62 which are connected in series across direct current supply conductors 22 and 32. However, when electric valve 53 is momentarily rendered conductive by the collapse of the voltage on capacitor 57, a negative impulse of voltage appears across resistor 62 to bias the right-hand half of valve 52 to cutoff. This increases the voltage of grid 68 positively to render the left-hand half of the valve fully conductive. As will be noted from the drawing, control member 50 of electric valve 48 is connected with the anode of the right-hand half of valve 52 through current limiting resistor 72, and the control member 51 of right-hand half of valve 48 is connected with the anode of the left-hand half of valve 52 through current limiting resistor 73. The magnitudes of resistors in the anode-cathode circuits of the valve 52 are such that when either discharge path of valve 52 is conducting, the control member of valve 48 associated therewith is biased sufficiently negative to bias the corresponding discharge path of valve 48 to cutoff. Since the charge on capacitor 56 disappears shortly after valve 53 is made conductive, the negative impulse impressed on control member 70 of valve 52 soon disappears and the normal conditions of valves 52 and 48 are restored. Also, as the charge on capacitor 56 collapses, a discharge path for capacitor 40 is established. This path is provided by a resistor 74 connected in series with an electric valve 75, preferably of the type employing an ionizable medium, and having its control member 76 connected with the negative terminal of capacitor 56. The control member is also connected with conductor 21 of the direct current supply circuit through a resistor 77. So long as the voltage on capacitor 56 remains negative, the valve 75 is maintained nonconductive. However, as soon as the voltage on capacitor 56 collapses, the valve 75 operates to discharge the capacitor 40. In order to insure a reversal of voltage on the anode of valve 75 when capacitor 40 is discharged, it may be desirable that resistor 74 have some inductance or that a separate inductance be provided. Features of the electronic switching circuit including valves 48 and 52 common to this application and application S. N. 508,610, filed November 1, 1943, now Patent No. 2,373,545, dated April 10, 1945, and assigned to the assignee of the present application, are claimed in the earlier filed application, which is now Patent 2,373.545 Cooper and Livingston, granted April 10, 1945.

In addition to providing an indication of the magnitude of the current or energy supplied to the weld during each weld period, it is often desirable to provide a signal or to shut down the welder in the event that the energy supplied to the weld departs from a pre-established value by a certain amount. In the illustrated embodiment of our invention, this is accomplished by a circuit responding to variations in the conductivity of the valve 36 which at all times conducts a current corresponding to the charge on capacitor 38, and as a result corresponding to the integral with respect to time of the current supplied to the load circuit during the last preceding period of energization. This indicating circuit includes a pair of relays 78 and 79 having their operating coils 80 and 81 connected, respectively, in series circuit relation with electric valves 82 and 83 and secondary windings 84 and 85 of transformer 23. Capacitors 86 and 87 are connected in parallel, respectively, with the coils 80 and 81 to maintain them energized during half cycles of negative voltage of the transformer windings 84 and 85. As indicated on the drawing, relay 78 has a normally open contact and relay 79 a normally closed contact. These contacts are connected in parallel and in series with a signaling means, such as an electric bell 88, to control the energization thereof from the alternating current circuit 11. The control members 89 and 90 of electric valves 82 and 83 are energized in accordance with the cathode voltage of electric valve 36 through conductor 91 and respective current limiting resistors 92 and 93. The cathodes of the electric valves 82 and 83 are connected at different levels of direct current voltage by means of voltage dividing resistors 94 and 95 which are connected in parallel across the direct current supply conductors 21 and 33. A movable tap 97 on resistor 94 is connected to the cathode of valve 83, and movable tap 98 on resistor 95 is connected with the cathode of valve 82. These adjustable taps are positioned so that with the desired amount of current being supplied to the weld and the corresponding conductivity of valve 36, electric valve 83 is conducting to hold the contacts of relay 79 open and valve 82 is nonconducting, allowing the contacts of relay 78 to remain open. When the current supplied to the load increases over the desired amount, the voltage of capacitor 38 is increased and the conductivity of valve 36 is increased. This raises the voltage of the control members 89 and 90, tending to render electric valve 82 conductive. The level of current at which the valve conducts may be adjusted by adjusting the contact 98. Similarly, if the load current decreases, the control members 89 and 90 become more negative with respect to the associated cathodes and at a predetermined level of current, depending upon the adjustment of contact 97, the valve 83 becomes nonconducting and relay 79 is deenergized to operate the signal 88. As will be clearly understood by those skilled in the art, the relays 78 and 79 may be provided with additional contacts for sealing themselves in once they are operated and for disabling the welding machine. Such an arrangement is shown, for example, in Patent 2,264,067 Chambers, granted November 25, 1941, and assigned to the assignee of the present invention.

Although the operation of the system is believed to be apparent from the foregoing detailed description, it may be briefly summarized as follows. After the welder has been placed in operation by closure of switch 18 for either spot or seam welding, the indicating instrument 34 indicates a quantity corresponding to the integral with respect to time of the current supplied to the load circuit in accordance with the weld current supplied to the load circuit during the last preceding period of energization. The manner in which this charge is maintained and adjusted during each off period will now be described. With the circuit connections described in detail for electric valves 48 and 52, it will be apparent that with valve 53 nonconducting the right-hand half of electric valve 52 is conducting and the left-hand half of valve 52 is biased to cutoff, and that for valve 48 the left-hand half is nonconducting and the right-hand half is conducting. These conditions of conductivity of valves 48 and 52 are maintained at all times except during a brief instant during each period of deenergization of the load circuit when the charge on capacitor 38 is being adjusted in accordance with the voltage of capacitor 40. When during periods of energization the right-hand half of valve 48 is conducting, it will be seen that the control member 47 of valve 46 is substantially at the voltage of conductor 33 and valve 46 is biased to cutoff. Also the discharge path in parallel with capacitor 38 is open by virtue of the left-hand discharge valve 48 being biased to cutoff. During this period of energization, capacitor 40 is being charged in increments corresponding to the current supplied to the welding transformer during each cycle of the supply circuit. In some installations it may be desirable to shunt capacitor 40 with a voltage limiting means which normally conducts little or no current but which will prevent the voltage from rising to a dangerously high value. Also, during this time electric valve 75 and electric valve 53 are maintained nonconductive by the bias voltages appearing across resistors 54 and 55 and derived from the timing circuit 17. At the end of each period of energization, the timing voltage disappears and the voltage across capacitor 57 collapses first by virtue of the respective magnitudes of the time constants of the discharge circuits for capacitors 57 and 56. This renders electric valve 53 conducting to supply a negative voltage impulse to control member 70 of electric valve 52 to bias it temporarily to cutoff. By virtue of the connection of control member 68 of the left-hand half of valve 52 with the anode of the right-hand half of valve 52, the left-hand half is rendered conducting as soon as the right-hand half is rendered nonconducting. This reverses the state of conductivity of the opposite halves of valve 48, biasing the right-hand half to cutoff and rendering the left-hand half conductive. This places the voltage of control member 47 of valve 46 at the voltage of capacitor 40 and with the parallel path including resistor 49 and left-hand discharge path 48 conductive permits the capacitor 38 to charge from the direct current source including conductors 21 and 33 to a new level of voltage corresponding to the voltage on capacitor 40. The negative impulse across resistor 62 is of short duration and the valves 52 and 48 are thereafter returned to their normal conditions of conductivity thereby interrupting the shunt path across capacitor 38 and biasing valve 46 to cutoff. Immediately after this operation has been completed the voltage across capacitor 56 collapses and electric valve 75 is rendered conductive to discharge capacitor 40 and place the system in condition for integrating the current supplied to the welding load during the next period of energization. As soon as the timing voltage appears the bias voltages across resistors 54 and 55 are re-established and the discharge valve 75 is maintained nonconductive.

Figure 2:
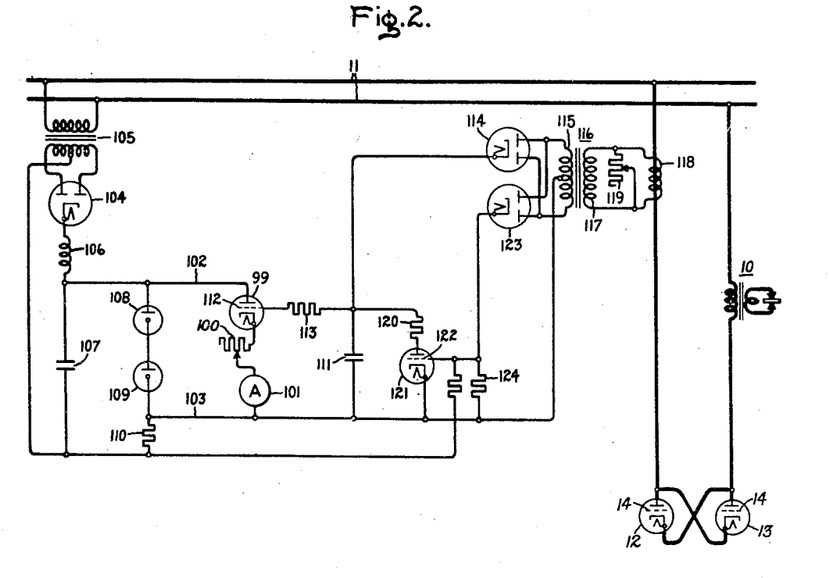
Fig. 2 is a schematic representation of a modification of Fig. 1.

In some applications it may not be necessary to obtain an indication of the integral with respect to time of the load current, and in Fig. 2 we have illustrated a modification of the arrangement shown in Fig. 1 in which the magnitude of the load or weld current, particularly of the end of the weld, is indicated. In Fig. 2 certain parts corresponding to parts of the embodiment illustrated in Fig. 1 have been designated by the same numerals and in the interest of simplification the control circuits for electric valves 12 and 13 and the circuit for operating the relays 78 and 79 have been omitted although it will be understood that they may form a part of the complete system. Referring now to Fig. 2, the circuit for indicating the current supplied to the welding transformer during each period of energization includes an electric valve 99 corresponding generally to valve 36 of Fig. 1. The anode-cathode circuit of electric valve 99 is connected in series with a resistor 100 and an indicating device such as an ammeter 101. This series circuit is energized by the voltage appearing across conductors 102 and 103 which are energized with direct current voltage derived from the alternating current supply circuit 11 by an electric valve rectifier 104 and an energizing transformer 105. The output of the rectifier is filtered by a series reactor 106 and shunt capacitor 107. Regulating discharge devices 108 and 109 and a resistor 110 are connected in series and across the capacitor 107. The conductivity of electric valve 99 is controlled by the charge on capacitor 111 which is connected between conductor 103 and the control member 112 of the valve 99 through a current limiting resistor 113. The capacitor is charged to a voltage depending upon the magnitude of the current supplied to the welding transformer, during each cycle of energization of the load circuit, by means of a full wave rectifier including an electric discharge device 114 and a midtapped secondary winding 115 of a transformer 116 having the primary winding 117 thereof energized from a current transformer 118 associated with one of the supply conductors of the welding transformer. A calibrating resistance 119 may be connected in shunt with the current transformer. In order to permit capacitor 111 to charge readily to a value corresponding to the maximum instantaneous value of current supplied to the welding transformer during each cycle of each period of energization, a path in shunt with the capacitor is provided which includes a series resistor 120 and the anode-cathode circuit of an electric valve 121. A control member 122 of the electric valve is energized with a negative bias component obtained from resistor 110 and during periods of energization is energized with a positive component of voltage appearing across resistor 124. This resistor is in the output circuit of a rectifier including discharge device 123 and the secondary winding 115 of transformer 116. Thus, the bias voltage across resistor 124 disappears when the load is deenergized, and the bias across resistor 110 maintains electric valve 121 biased to cutoff so that the charge on capacitor 111 is maintained during each period of deenergization. When valve 121 is conducting, it simply allows capacitor 111 to charge readily to a value corresponding to the peak value of current supplied to the load circuit. Capacitor 111, its charging circuit, and its discharge circuit including valve 122 and the control therefor form the subject matter of claims in our divisional application, Serial No. 771,526, filed August 30, 1947.

Figure 3:
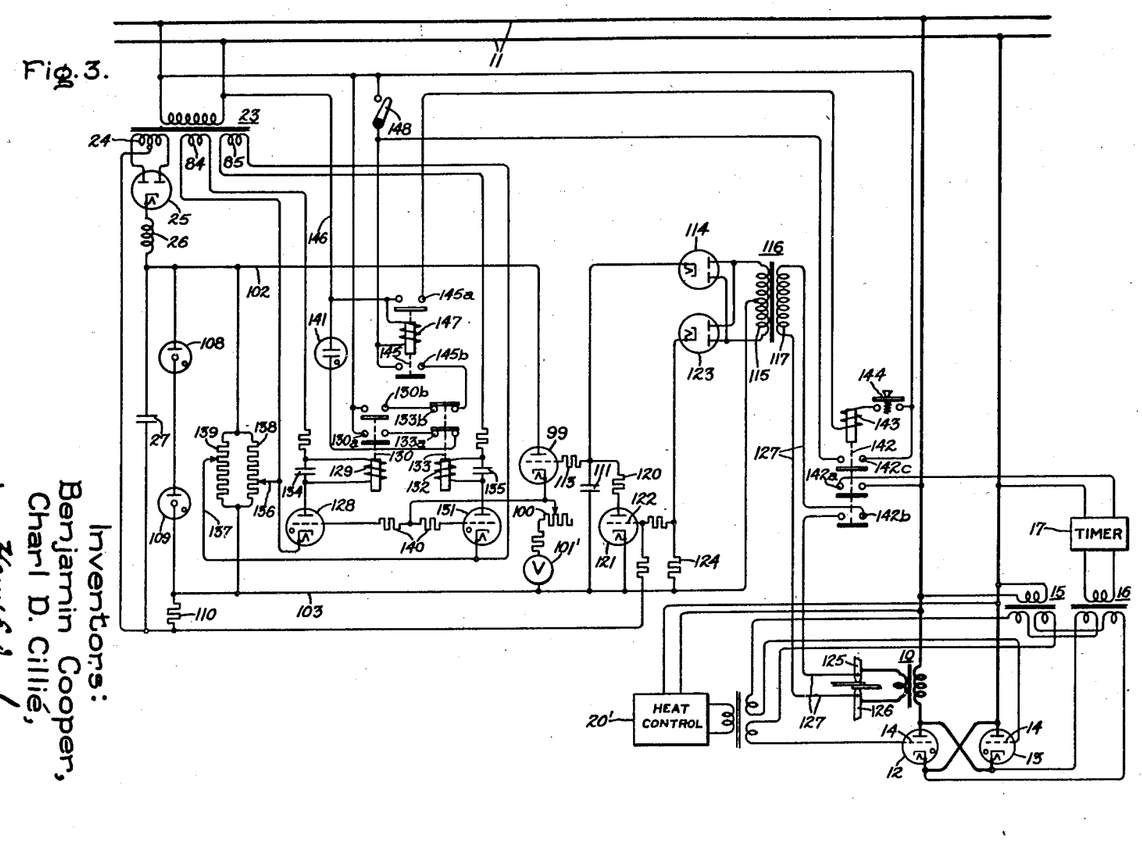
Fig. 3 is a schematic representation of a further embodiment of our invention.

The circuit arrangement illustrated in Fig. 3 is in general similar to the arrangement of Fig. 2. In Fig. 3, the circuit is utilized for obtaining an indication of the voltage across the work at the end of the weld period in accordance with the method described and claimed in the above-mentioned Spittler and Johnson application. Since the voltage across the weld changes substantially during the weld period, it is essential that any lockout circuit provided on the control be disabled until the end of the weld period so that the system will be locked out only if the voltage at that time is outside of the prescribed limits. In Fig. 3 various elements of the system have been designated by the same reference numerals as employed in Figs. 1 and 2 where the elements correspond exactly. Referring now to Fig. 3, it will be noted that the control or indicating circuit responds directly to the voltage across the welding electrodes 125 and 126 which are, in turn, energized from the secondary of the welding transformer 10. The voltage across the electrodes is impressed on the primary winding 117 of transformer 116 through conductors 127 which are secured in good electrical contact with the electrodes as close to the ends of the electrodes as mechanical considerations allow.

The indicating circuit employed in the arrangement of Fig. 3 is quite similar to that of Fig. 1 and includes in addition a lockout circuit and provision for preventing operation of the lockout when the variation in the condition being measured from a predetermined value occurs at any but the time which has been chosen as the critical time, for example at the end of the weld. An electric discharge valve 128 has the anode-cathode circuit thereof energized from a secondary winding 84 of the transformer 23 through a circuit including the operating coil 129 of a relay 130 which corresponds generally to relay 79 of Fig. 1. In a similar manner, a second electric discharge valve 131 has the anode-cathode circuit thereof connected for energization from the secondary winding 85 of transformer 23 through a circuit including the operating coil 132 of a relay 133. Capacitors 134 and 135 are connected in shunt with the operating coils 129 and 132, respectively, to maintain the coils energized during the negative half cycles of voltage of the electric discharge valves 128 and 131. The cathodes of electric valves 128 and 131 are maintained at adjustable levels of voltage with respect to conductors 102 and 103 by conductors 136 and 137 which engage voltage dividing resistors 138 and 139, respectively. These voltage dividing resistors are energized in parallel from the direct current supply conductors 102 and 103. The control members of electric valves 128 and 131 are connected together through current limiting resistor 140 and to the cathode of electric valve 99 so that the voltage of the control members varies with variations in charge on the capacitor 111. The conductors 136 and 137 are adjusted so that electric valve 128 is conducting when the charge on the capacitor 111 is above the minimum value for a satisfactory weld. If the voltage of capacitor 111 drops below a level determined by the position of the conductor 136, electric valve 128 ceases to conduct and if it rises above a predetermined value determined by the conductor 137, electric valve 131 is rendered conducting. This operation of electric valves 128 and 131 and the resulting operation of relays 130 and 133 is employed to provide a visual indication that the weld is satisfactory or unsatisfactory, and to control the lockout circuit. In the arrangement shown in Fig. 3, the indication is provided by a lamp 141 which is connected for energization from the alternating current supply circuit 11 through normally open contact 130a of relay 130 and normally closed contact 133a of relay 133. Since relay 130 is energized and relay 133 is deenergized when the voltage across the weld is in the normal range for a satisfactory weld, lamp 141 will be illuminated at the end of each weld when the weld is satisfactory.

As previously mentioned, the value of the voltage across the weld may lie outside the desired range during a portion of the weld period and still lie within the range during the period which has been selected to indicate whether or not a satisfactory weld has been made. For this reason, it is necessary to prevent the lockout system from operating except when the system indicates that a bad weld has been made by the magnitude of the voltage of capacitor 111 at the end of the weld period. Referring now to Fig. 3, the initiating circuit of the timer 17 includes a normally open contact 142a of a relay 142, the operating coil 143 of which is energized from the alternating current supply circuit through an initiating switch 144, a normally open contact 145a of a lockout relay 145 and a conductor 146. Relay 142 also includes a normally open contact 142b which when closed completes the circuit of the primary winding 117 of transformer 116 and a contact 142c which when closed completes a circuit for the operating coil 147 of relay 145. An energizing circuit for the operating coil 147 is also completed through a parallel circuit including normally open contact 145b on lockout relay 145, normally closed contact 133b on relay 133 and a normally open contact 130b on relay 130. A manual switch 148 is provided for shunting contact 142c of relay 142 to pick up the lockout relay when the first weld is made. The above described means for disabling the lockout circuit until the end of a weld has been claimed in our above-identified divisional application, Serial No. 771,526.

A brief description of the operation of the circuit of Fig. 3 will indicate how the lockout circuit is disabled except when the circuit indicates that a bad weld has been made by the value of voltage on capacitor 111 at the end of the weld. Since the energizing circuit of the operating coil 143 of relay 142 includes a normally open contact 145a of lockout relay 145, it is essential to energize relay 145 when the system is first placed in operation. This is accomplished by closing manual switch 148 which is allowed to remain closed during the first weld. Let it be assumed that this first weld has taken place and that the switch 148 has been opened and further that the capacitor 111 at the end of this first weld was charged to a voltage within the range indicating a satisfactory weld. Under these conditions electric valve 128 is conducting, relay 130 is energized, lamp 141 is illuminated and the operating coil of relay 145 is energized through a circuit including contact 145b and contacts 130b and 133b. Contact 145a of lockout relay 145 remains closed and the welding circuit may be re-initiated by release and reclosure of contact 144. If, however, the voltage on capacitor 111 is sufficiently low, valve 128 remains nonconducting and contact 130b remains open and if the charge on capacitor 111 is above a predetermined value, contact 133b opens, thus deenergizing the indicating lamp 141 and deenergizing the operating coil of lockout relay 145. Since the voltage on the capacitor which is to be used as an indication of the weld quality is the voltage at the end of the weld period, it is essential to prevent relay 145 from dropping out during the initial portion of the weld. This is accomplished by the parallel energizing circuit for the operating coil 147 including contact 142c of the initiating relay. With this circuit the voltage on capacitor 111 at the end of the weld period is the only voltage which is effective to lock out the welder by dropping out relay 145 since at any time prior to release of the starting switch 144, the lockout relay is held in by the contact 142c of initiating relay 142.

From the foregoing description it is apparent that in circuits embodying the present invention, the indication provided is not rendered difficult to utilize when the periods of deenergization occur at rather close intervals as they may in seam or pulsation spot welding. In the operation of the modification of Fig. 1, for example, the needle of the ammeter holds a constant reading until the periods of deenergization of the load when it is quickly adjusted to a new level if the voltage of capacitor 60 indicates that a different amount of current has been supplied to the load, and this reading is then maintained during the remainder of the period of deenergization and the next period of energization. In the circuit arrangements illustrated in Figs. 2 and 3, the reading of the indicating instrument is adjusted during each period of energization and is maintained during the succeeding periods of deenergization at a value dependent upon the voltage or current condition existing during the last cycle of the preceding period of energization. This is a particularly desirable feature in the arrangement of Fig. 3 since the value of voltage across the weld at the time the weld is completed is a good indication of the weld quality.

The arrangements above disclosed of means including a device for obtaining a measurement of the last half cycle value of an electrical condition that occurs in a load circuit during a period of energization thereof and for maintaining the energization of said device and said measurement during the immediately following period of deenergization of the load circuit is broadly claimed in application Serial No. 534,120 of Orrin W. Livingston, filed May 4, 1944, for Circuit for measuring the last half cycle voltage across a resistance weld, and assigned to the assignee of this invention. This Livingston application also contains claims to the above disclosed arrangements in which the energization of the indicating device is controlled by the anode-cathode current flow of an electric valve having its control element connected to be responsive to the voltage of a capacitor which is charged to a voltage indicative of the magnitude of the last half cycle value of an electrical condition of the load circuit.

While we have shown and described a particular embodiment of our invention, it will be obvious to those skilled in the art that changes and modifications may be made without departing from our invention in its broader aspects, and we therefore aim in the appended claims to cover all such changes and modifications as fall within the true spirit and scope of our invention.

What we claim as new and desire to secure by Letters Patent of the United States is:

1. A circuit for providing an indication of the current supplied to an intermittently energized load circuit comprising in combination a source of direct current voltage, an electric valve and an indicating device connected in series and for energization from said source, said valve including a control member, a capacitor, means for charging said capacitor to a voltage dependent upon the current supplied during each period of energization to said load circuit, a resistor and a second electric valve connected with said capacitor for establishing a discharge circuit therefor, said second electric valve including a control member, means connecting the control member of said first mentioned electric valve with said capacitor to vary the current supplied to said indicating device in accordance with the voltage of said capacitor, and means for controlling the energization of the control member of said second electric valve in accordance with the periods of energization and deenergization of said load circuit to establish the time that said discharge circuit is effective.

2. A circuit for providing an indication of the current supplied to an intermittently energized load circuit comprising, in combination, a capacitor, means for charging said capacitor in accordance with the current supplied to said load circuit, a second capacitor, means for adjusting the charge on said second capacitor during each period of deenergization of said load circuit to a value dependent upon the charge acquired by said first mentioned capacitor during the preceding period of energization of said load circuit, and means for preventing discharge of said second capacitor except when adjustment is being made.

3. In combination, a load circuit, means for supplying timed applications of current to said load circuit, a capacitor, means for charging said capacitor in accordance with the time integral of current supplied to said load circuit during each period of energization, a second capacitor, means for adjusting the charge on said second capacitor during each period of deenergization of said load circuit to a value dependent upon the charge acquired by said first mentioned capacitor during the preceding period of energization of said load circuit, means for preventing discharge of said second capacitor except when adjustment is being made, and means responsive to the voltage of said second capacitor for effecting a circuit controlling operation when the charge on said second capacitor varies from a predetermined value by a pre-established amount.

4. In combination, a circuit, means for supplying timed applications of current through said circuit, a capacitor, means for establishing a voltage on said capacitor dependent upon the time integral of current supplied to said circuit during each period of energization, a second capacitor, means for establishing a charging circuit for said second capacitor, means for establishing a discharging circuit for said second capacitor, means for rendering both said charging and discharging circuits ineffective during periods of energization of said load circuit, and means for controlling said charging and discharging circuits during each period of deenergization to adjust the voltage of said second capacitor in accordance with the voltage acquired by said first capacitor during the immediately preceding period of energization.

5. In combination, a load circuit, means for supplying timed applications of current through said load circuit including timing means, a capacitor, means for establishing a voltage on said capacitor dependent upon the current supplied to said circuit during each period of energization, a second capacitor, means for establishing a charging circuit for said second capacitor, means for establishing a discharging circuit for said second capacitor, means for rendering both said charging and discharging circuits ineffective during periods of energization of said load circuit, and means operated in accordance with the operation of said timing means for controlling said charging and discharging circuits to make a single adjustment of the voltages of said second capacitor in accordance with the voltage acquired by said first capacitor during the immediately preceding period of energization of said load circuit.

6. A circuit for deriving an electrical quantity dependent upon the current supplied to an intermittently energized load circuit comprising, in combination, timing means for determining the periods of energization and deenergization of said load circuits, a capacitor, means for charging said capacitor in accordance with the current supplied to said load circuit during each period of energization, a source of voltage, a second capacitor, means including an electric valve for establishing a circuit for charging said second capacitor from said source of voltage, means for normally rendering said charging circuit ineffective, and means responsive to said timing means for controlling said charging circuit to adjust the voltage on said second capacitor in accordance with the voltage acquired by said first capacitor during the immediately preceding period of energization of said load circuit.

7. A load circuit for deriving an electrical quantity dependent upon the current supplied to an intermittently energized load circuit comprising, in combination, timing means for determining the periods of energization and deenergization of said load circuit, a capacitor, means for charging said capacitor in accordance with the integral with respect to time of the current supplied to said load circuit during each period of energization, a second capacitor, means for establishing a charging circuit for said second capacitor and a discharging circuit for said second capacitor, means normally rendering both said circuits ineffective, and means including electronic switching means responsive to operation of said timing means for rendering said charging and discharging circuits effective for an interval of short duration during each period of deenergization of said load circuit to adust the voltage on said second capacitor in accordance with the voltage acquired by said first capacitor during the immediately preceding period of energization of said load circuit.

8. A circuit for providing an indication of the current supplied to an intermittently energized load circuit comprising, in combination, a capacitor, means for charging said capacitor in accordance with the current supplied to said load circuit during each period of energization, a second capacitor, means for establishing a charging circuit for said second capacitor to charge said second capacitor in accordance with the voltage acquired by said first mentioned capacitor during the preceding period of energization, timing means for establishing the periods of energization and deenergization of said load circuit, and means responsive to said timing means for controlling the circuit of said second capacitor to establish the interval during which the voltage is adjusted and for maintaining the voltage on said capacitor except during the interval of adjustment.

9. A circuit for deriving an electrical quantity dependent upon the current supplied to an intermittently energized load circuit comprising, in combination, a capacitor, means for charging said capacitor in accordance with the time integral of current supplied to said load circuit during each period of energization, a source of voltage, a second capacitor, means including an electric valve for establishing a circuit for charging said second capacitor from said source in accordance with the voltage acquired by said first mentioned capacitor during the preceding period of energization, timing means for establishing the periods of energization and deenergization of said load circuit, means responsive to said timing means for controlling said electric valve to establish the period during which the voltage is adjusted and for maintaining the voltage on said capacitor except during the period of adjustment, and means responsive to said timing means for discharging said first capacitor after each adjustment of voltage of said second capacitor.

10. In combination, a load circuit, means for supplying timed applications of current to said load circuit including timing means, means responsive to said timing means for producing a unidirectional voltage having a duration coextensive with the applications of current to said load circuit, a pair of circuits energized in series from said unidirectional voltage and each including a resistance and a capacitance in parallel, each of said last mentioned circuits having different time constants, and means responsive to the decay of voltage across the respective capacitances of said pair of circuits for effecting sequential circuit controlling operations during periods of deenergization of said load circuit.

11. A circuit for deriving an electrical quantity dependent upon the current supplied to an intermittently energized load circuit comprising, in combination, timing means for determining the periods of energization of said load circuit, a capacitor, means for charging said capacitor in accordance with the time integral of current supplied to said load circuit during each period of energization, means for indicating the magnitude of the charge acquired by said capacitor during each period of energization of said load circuit, means for controlling the operation of said indicating means, in accordance with the voltage on said capacitor and thereafter discharging said capacitor comprising means responsive to said timing means for producing a unidirectional voltage having a duration coextensive with the applications of current to said load circuit, a pair of circuits energized in series from said unidirectional voltage and each including resistance and capacitance in parallel, each of said last mentioned circuits having differential time constants, and means responsive to the decay of voltage across the respective capacitances of said last mentioned circuits for effecting sequential connections of said capacitor to said indicating means and discharge of said capacitor.

12. A circuit for providing an indication of the magnitude of an electrical condition of an intermittently energized load circuit comprising in combination a source of direct current voltage, an electric valve and an indicating device connected in series and for energization from said source, said valve including a control member, a capacitor, means for charging said capacitor to a voltage dependent upon an electrical quantity of said load circuit during each period of energization thereof, a resistor and a second electric valve connected with said capacitor for establishing a discharge circuit therefor, said second electric valve including a control member, means connecting the control member of said first mentioned electric valve with said capacitor to vary the energization of said indicating device in accordance with the voltage of said capacitor, and means for controlling the energization of the control member of said second electric valve in accordance with the periods of energization and deenergization of said load circuit to establish the time that said discharge circuit is effective.

13. In combination, a direct current supply circuit, a capacitor, an electric valve including a pair of principal electrodes and a control member, a source of control voltage, means connecting the principal electrodes of said electric valve in series with said capacitor and across said circuit and said control member to said source of control voltage to control the charging of said capacitor, a second electric valve energized from said direct current circuit and including an anode, a cathode and a control member, a meter including an element connected with the cathode of said second electric valve as a cathode circuit resistor to provide cathode follower operation of said second electric valve, means connecting said meter element and said electric valve for energization from said direct current circuit, and means connecting the control member of said second electric valve with one terminal of said capacitor so that the control member of said second electric valve is energized in accordance with the voltage across said meter element and the voltage of said capacitor.

BENJAMIN COOPER.
CHARL D. CILLIÉ.

REFERENCES CITED

The following references are of record in the file of this patent:

UNITED STATES PATENTS

| Number | Name | Date |
|---|---|---|
| 2,014,102 | Conklin | Sept. 10, 1935 |
| 2,143,219 | Wenger | Jan. 10, 1939 |
| 2,147,918 | Overbeck | Feb. 21, 1939 |
| 2,264,067 | Chambers | Nov. 25, 1941 |
| 2,300,198 | Brown | Oct. 27, 1942 |
| 2,309,560 | Welty | Jan. 26, 1943 |
| 2,325,390 | Garman | July 27, 1943 |
| 2,331,229 | Reagan | Oct. 5, 1943 |